US008888585B1

(12) United States Patent
Beechey et al.

(10) Patent No.: US 8,888,585 B1
(45) Date of Patent: Nov. 18, 2014

(54) GAME CONSOLE SYSTEM, METHOD AND COMPUTER PROGRAM PRODUCT WITH ANTI-MALWARE/SPYWARE AND PARENTAL CONTROL CAPABILITIES

(75) Inventors: Mostyn J. Beechey, Aylesbury (GB); Paul N. Gartside, Newport (GB); Henry C. Stern, Halifax (CA)

(73) Assignee: McAfee, Inc., Santa Clara, CA (US)

( * ) Notice: Subject to any disclaimer, the term of this patent is extended or adjusted under 35 U.S.C. 154(b) by 1939 days.

(21) Appl. No.: 11/432,205

(22) Filed: May 10, 2006

(51) Int. Cl.
*A63F 13/12* (2006.01)

(52) U.S. Cl.
USPC .................................. 463/29; 726/22; 726/23

(58) Field of Classification Search
CPC .. G06F 17/30; A63F 13/12; A63F 2300/5586
USPC .......................................................... 463/43
See application file for complete search history.

(56) References Cited

U.S. PATENT DOCUMENTS

| | | | | |
|---|---|---|---|---|
| 5,956,481 | A * | 9/1999 | Walsh et al. | 726/23 |
| 6,886,099 | B1 * | 4/2005 | Smithson et al. | 726/24 |
| 7,281,268 | B2 * | 10/2007 | Hollander et al. | 726/22 |
| 7,340,774 | B2 * | 3/2008 | Hursey et al. | 726/22 |
| 7,346,922 | B2 * | 3/2008 | Miliefsky | 726/3 |
| 7,444,413 | B2 * | 10/2008 | Saxena | 709/229 |
| 2002/0099952 | A1 * | 7/2002 | Lambert et al. | 713/200 |
| 2002/0152117 | A1 | 10/2002 | Cristofalo et al. | 705/14 |
| 2004/0266533 | A1 * | 12/2004 | Gentles et al. | 463/42 |
| 2005/0223238 | A1 * | 10/2005 | Schmid et al. | 713/188 |
| 2005/0268112 | A1 * | 12/2005 | Wang et al. | 713/188 |
| 2005/0278785 | A1 * | 12/2005 | Lieberman | 726/24 |
| 2006/0031940 | A1 * | 2/2006 | Rozman et al. | 726/27 |
| 2006/0075502 | A1 * | 4/2006 | Edwards | 726/24 |
| 2006/0130141 | A1 * | 6/2006 | Kramer et al. | 726/23 |
| 2006/0150256 | A1 * | 7/2006 | Fanton et al. | 726/27 |
| 2006/0230451 | A1 * | 10/2006 | Kramer et al. | 726/22 |
| 2006/0253458 | A1 * | 11/2006 | Dixon et al. | 707/10 |
| 2007/0006304 | A1 * | 1/2007 | Kramer et al. | 726/22 |
| 2007/0013515 | A1 * | 1/2007 | Johnson et al. | 340/568.1 |
| 2007/0026946 | A1 * | 2/2007 | Newborn | 463/42 |
| 2007/0054729 | A1 * | 3/2007 | Hornik et al. | 463/16 |
| 2007/0149279 | A1 * | 6/2007 | Norden et al. | 463/29 |
| 2007/0156727 | A1 * | 7/2007 | Lim | 707/100 |
| 2007/0179987 | A1 * | 8/2007 | Lim | 707/200 |
| 2007/0180509 | A1 * | 8/2007 | Swartz et al. | 726/9 |
| 2007/0180530 | A1 * | 8/2007 | Verma et al. | 726/24 |
| 2007/0220518 | A1 * | 9/2007 | Verbowski et al. | 718/102 |
| 2007/0289019 | A1 * | 12/2007 | Lowrey | 726/24 |
| 2008/0115204 | A1 * | 5/2008 | Ramsey et al. | 726/13 |

FOREIGN PATENT DOCUMENTS

WO         2005/001660        1/2005

OTHER PUBLICATIONS

"Antivirus Software" http://en.wikipedia.org/w/index.php?title=Antivirus_software&printables=yes.
"Parental Controls" http://en.wikipedia.org/w/index.php?title=Parental_controls&printables=yes.

* cited by examiner

*Primary Examiner* — Paul A D'Agostino
(74) *Attorney, Agent, or Firm* — Patent Capital Group (57) ABSTRACT

A system, method and computer program product are provided for securing a game console capable of processing game-related data. In use, the game-related data is scanned for detecting malware. Additionally, the game-related data is scanned for detecting spyware. Further, parental controls are executed during use of the game console.

25 Claims, 6 Drawing Sheets

GAME CONSOLE SYSTEM, METHOD AND COMPUTER PROGRAM PRODUCT WITH ANTI-MALWARE/SPYWARE AND PARENTAL CONTROL CAPABILITIES

FIELD OF THE INVENTION

The present invention relates to game consoles, and more particularly to securing game consoles.

BACKGROUND

Increasingly, computer systems have needed to protect themselves against unwanted computer code. Such unwanted computer code has generally taken the form of viruses, worms, Trojan horses, spyware, adware, and so forth. The damage and/or inconvenience capable of being incurred by these types of unwanted code has ranged from mild interference with a program, such as the display of an unwanted political message in a dialog box, to the complete destruction of contents on a hard drive, and even the theft of personal information.

Such problems are not limited to general computers. Currently, most modern game consoles, such as the Microsoft® Xbox® and Xbox 360™ game consoles and Sony® PlayStation® 2 game console are Internet-capable. Users of game consoles are encouraged to access the Internet via a broadband or dial-up connection and play multiplayer games, etc. These game consoles each run either a proprietary operating system or a commercial operating system. For example, the Microsoft® Xbox® game console uses the Windows™ operating system. As such, the game consoles are potentially open to infection from unwanted computer code.

In addition, the game consoles may also act as a vector for spreading viruses during Internet gaming. Furthermore, there is a risk of the game consoles becoming part of a "botnet" or "zombie" network, and being used either as part of a distributed denial of service (DDoS) attack or a re-sender of unsuitable and/or illegal content. Another problem associated with Internet-capable game consoles is that such game consoles are capable of browsing the Internet and communicating over the Internet. As these consoles are often the property of minors, there is a danger of unsuitable content being made available to such younger users.

There is thus a need for overcoming one or more of these and/or other problems associated with the prior art.

SUMMARY

A system, method and computer program product are provided for securing a game console capable of processing game-related data. In use, the game-related data is scanned for detecting malware. Additionally, the game-related data is scanned for detecting spyware. Further, parental controls are executed during use of the game console.

DETAILED DESCRIPTION

Figure 1:
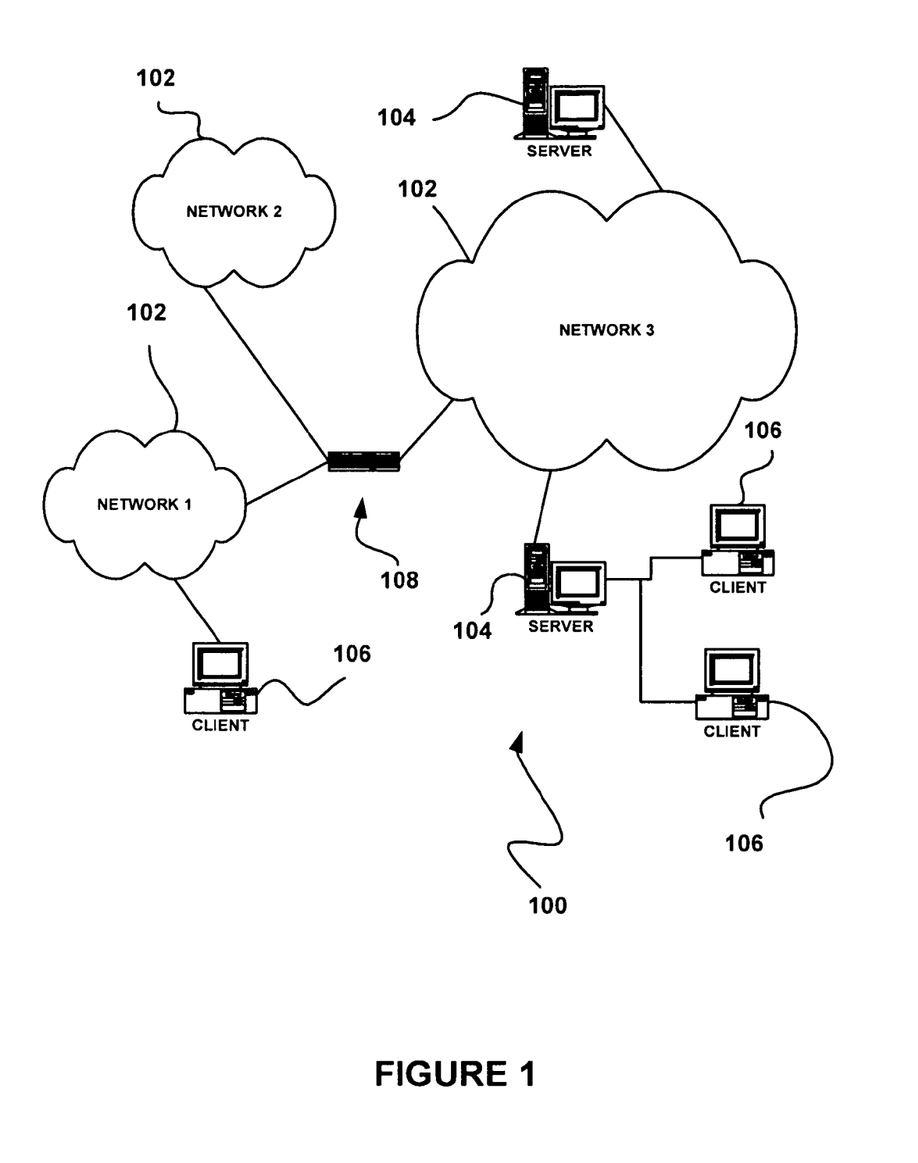
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are server computers 104 which are capable of communicating over the networks 102. Also coupled to the networks 102 and the server computers 104 is a plurality of client computers 106. Such server computers 104, client computers 106 as well as any other unillustrated devices may each include a desktop computer, lap-top computer, hand-held computer, mobile phone, personal digital assistant (PDA), peripheral (e.g. printer, etc.), game console, any component of a computer, and/or any other type of logic. In order to facilitate communication among the networks 102, at least one gateway 108 is optionally coupled therebetween.

Figure 2:
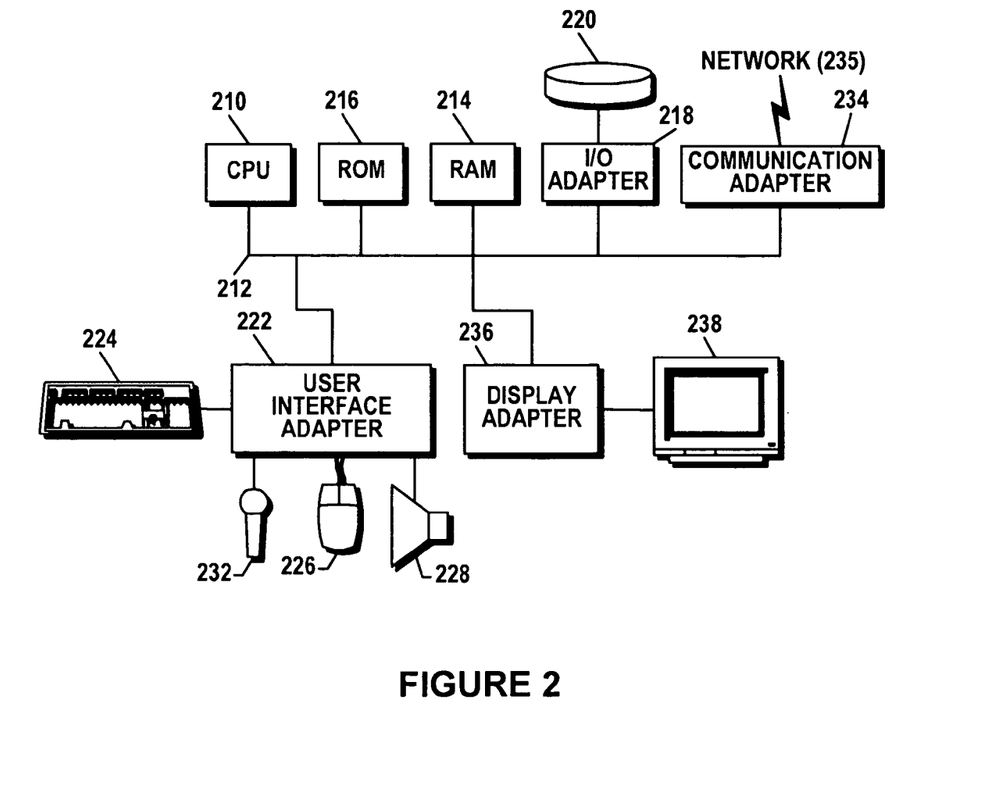
FIG. 2 shows a representative hardware environment that may be associated with the server computers and/or client computers of FIG. 1, in accordance with one embodiment.

FIG. 2 shows a representative hardware environment that may be associated with the server computers 104 and/or client computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
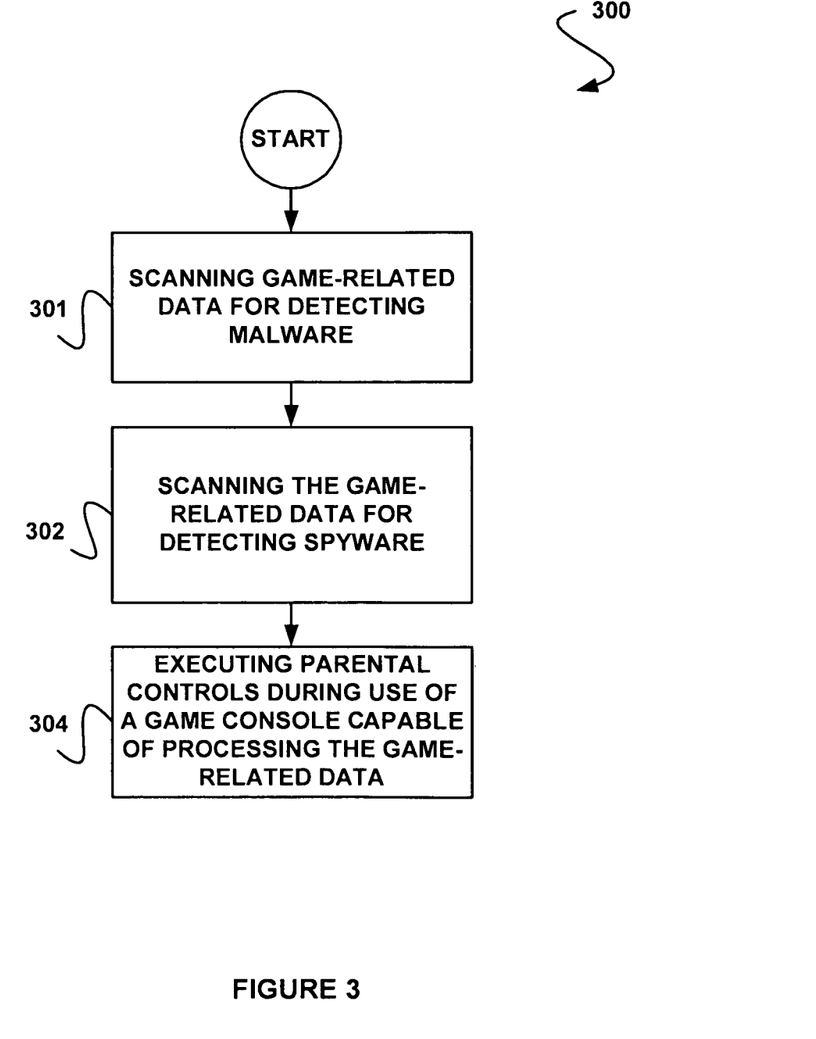
FIG. 3 shows a game console method for scanning game-related data and executing parental controls, in accordance with one embodiment.

FIG. 3 shows a game console method 300 for scanning game-related data and executing parental controls, in accordance with one embodiment. As an option, the method 300 may be implemented in the context of the architecture and environment of FIGS. 1 and/or 2. Of course, however, the method 300 may be carried out in any desired environment.

As shown in operation 301, game-related data is scanned for detecting malware. The game-related data may include any data capable of being stored, processed, and/or communicated utilizing a game console. For example, the game-related data may include, but is not limited to data stored on a hard drive of the game console, data stored on a game cartridge capable of being used with the game console, data stored on a removable memory stick capable of being used with the game console, data stored on a digital video disc (DVD) capable of being used with the game console, data stored in other memory of the game console, and/or any other data associated with a game console. In various embodiments, the game-related data may include, but is not limited to a video game stored in memory of the game console, data associated with an operating system of the game console, game applications associated with the game console, user-specific data (e.g. game-related user profile information, user scores, etc.) and/or any other data associated with the game console.

In addition, in the context of the present description, the malware may include any unwanted data capable of damaging the game console and/or any other device coupled thereto. For example, the malware may include a virus, a Trojan, a worm, and/or any other types of unwanted data capable of being detected. Further, while the game console may include any device at least primarily dedicated for game play involving the processing of the game-related data, one exemplary game console will be described in further detail during reference to FIG. 4 for illustrative purposes.

Further, the game-related data is scanned for detecting spyware, as shown in operation 302. In the context of the present description, the spyware may include any type of unwanted data that is less detrimental with respect to malware, but is nevertheless at least potentially unwanted. Specifically, the spyware may optionally include unwanted data capable of collecting information and/or reporting information associated with the game console, adware, etc.

Still yet, in operation 304, parental controls are executed during use of the game console. In the context of the present description, such use of the game console may include accessing the game-related data utilizing the game console, game play associated with the game console, accessing a network such as the Internet utilizing the game console (e.g. downloading data to the game console from the network, browsing the Internet utilizing the game console, communicating with other users over a network utilizing the game console, etc.), and/or any other functionality capable of being carried out utilizing the game console.

Further, in some optional embodiments, the parental controls may utilize at least one policy capable of limiting the available functionality of the game console. For example, the parental controls may prevent specified types of game-related data from being accessible to users of the game console. Of course, in the context of the present description, the parental controls may include any parent-type control that limits any aspect of the aforementioned use of the game console. More illustrative examples of such parental controls will be described in more detail with respect to FIG. 6.

Additional illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
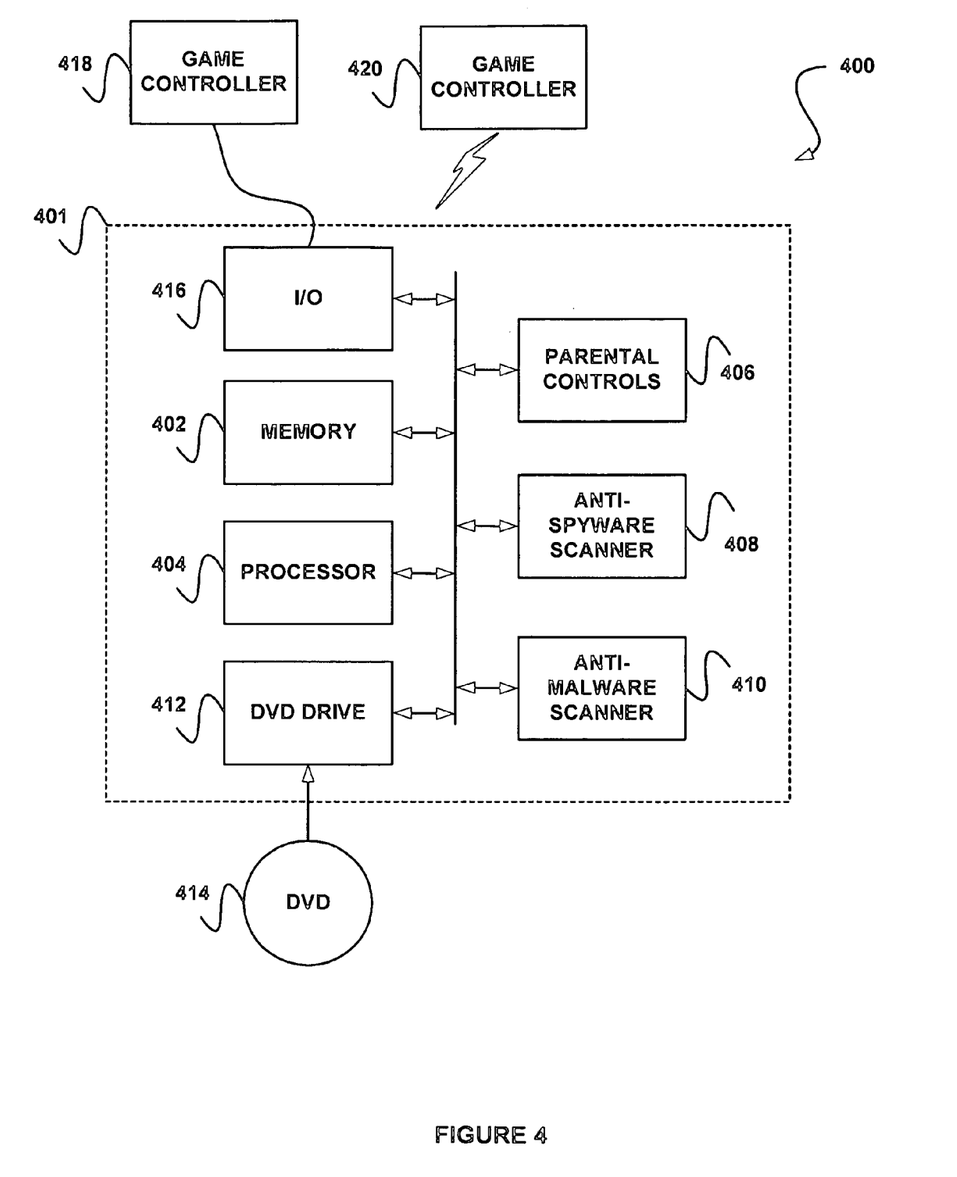
FIG. 4 shows a game console architecture, in accordance with another embodiment.

FIG. 4 shows a game console architecture 400, in accordance with another embodiment. As an option, the architecture 400 may be implemented in the context of the architecture and environment of FIGS. 1-3. Of course, however, the architecture 400 may be carried out in any desired environment. It should also be noted that the aforementioned definitions may apply during the present description.

As shown, the game console architecture 400 may include a gaming system 401 for processing game-related data. Specifically, the gaming system 401 may take the form of various hardware and/or software. As an option, the gaming system 401 may include an operating system embedded therein (not shown). In such embodiment, the game console architecture 400 may not necessarily include a keyboard, mouse, etc. In another optional embodiment, the gaming system 401 may include a system dedicated only to game play. In other optional embodiments, the gaming system 401 may also possibly include functionality for playing and/or storing music data, for connecting to a network (e.g. the Internet, peer-to-peer, etc.), and/or any other functionality capable of being performed with the gaming system 401 described herein.

As shown, the gaming system 401 may include memory 402 and a processor 404 for storing and processing game-related data, respectively. Examples of such memory 402 may include a hard drive, RAM, ROM, removable memory cartridges, and/or any other memory capable of being embodied within the gaming system 401. Furthermore, the processor 404 may include any processing device capable of processing game-related data. Of course, the memory 402 and processor 404 may optionally include those described above with respect to FIG. 2.

Also included in such gaming system 401 is a parental controls module 404, an anti-spyware scanner 408, and an anti-malware scanner 410. It should be noted that the parental controls module 404, the anti-spyware scanner 408, and/or the anti-malware scanner 410 may be implemented with the gaming system alone or in combination with each other. Furthermore, the parental controls module 404, the anti-spyware scanner 408, and/or the anti-malware scanner 410 may each optionally be embodied within the gaming system 401, as shown in FIG. 4, but may also be utilized external to the gaming system 401.

For example, the parental controls module 404, the anti-spyware scanner 408, and/or the anti-malware scanner 410 may be embodied on a DVD, CD, removable memory stick, etc. Specifically, they may be embodied on a device containing a game application (e.g. game DVD, CD, etc.) capable of being inserted into the gaming system 401, embodied on a hard drive of the gaming system 401, embodied on a game cartridge capable of being inserted into one of multiple slots associated with the gaming system 401, embodied on a server accessible over a network in connection with the gaming system 401, and/or implemented in any other way capable of being utilized by the gaming system 401.

In one optional embodiment, the parental controls module 404 may include logic for executing controls on game-related data utilized with the gaming system 401. In addition, the anti-spyware and anti-malware scanners 408, 4110 may include logic for scanning game-related data for malware and spyware. It should be noted that the logic of the anti-malware scanner 410 and the anti-spyware scanner 408 may be implemented separately (as shown) or in conjunction (not shown). Still yet, a firewall (not shown) may be included within the gaming system 401 and/or any peripheral devices connected to the gaming system 401. The firewall may be capable of blocking specified types of data from being communicated to the gaming system 401 over a network.

Also included in the gaming system 401 may be a DVD drive 412 capable of reading data from a DVD 414 inserted into the DVD drive 412. Thus, the gaming system 401 may read game-related data, such as game applications, from the DVD 414 and may further process such game-related data. In addition, the gaming system 401 may read parental controls and/or scanning logic, such as those described above, from the DVD 414. Still yet, the DVD drive 412 may be utilized to read updates from the DVD 414. Just by way of example, such updates may include updates to the parental controls 406, updates to the anti-spyware scanner 408 (in the form of signatures, rules, and/or associated logic, etc.), updates to the anti-malware scanner 410 (in the form of signatures, rules, and/or associated logic, etc.).

Furthermore, the gaming system 401 may include an I/O adapter 416 for connecting peripheral devices, such as for example a wire-line game controller 418 and/or a wireless game controller 420, as shown. While not shown, such wire-line game controller 418 and/or wireless game controller 420 may each include one or more joysticks, one or more sets of coordinate buttons (e.g. with each set including a left button, a right button, an up button, a down button, etc.), a pair of buttons positioned on a front face thereof for being depressed by fingers of a user when the coordinate buttons are being manipulated by thumbs of the user, and/or a fire button, etc. As a further option, the wire-line game controller 418 and/or wireless game controller 420 may include a camera for allowing a user to kinetically interact with games during play.

Still yet, the I/O adapter 416 may also be utilized to connect a removable memory stick and/or cartridge to the gaming system 401 (not shown). In this way, a gaming system 401 is provided that is capable of reading and processing game-related data, along with scanning such game-related data for unwanted data and executing parental controls on such game-related data.

Figure 5:
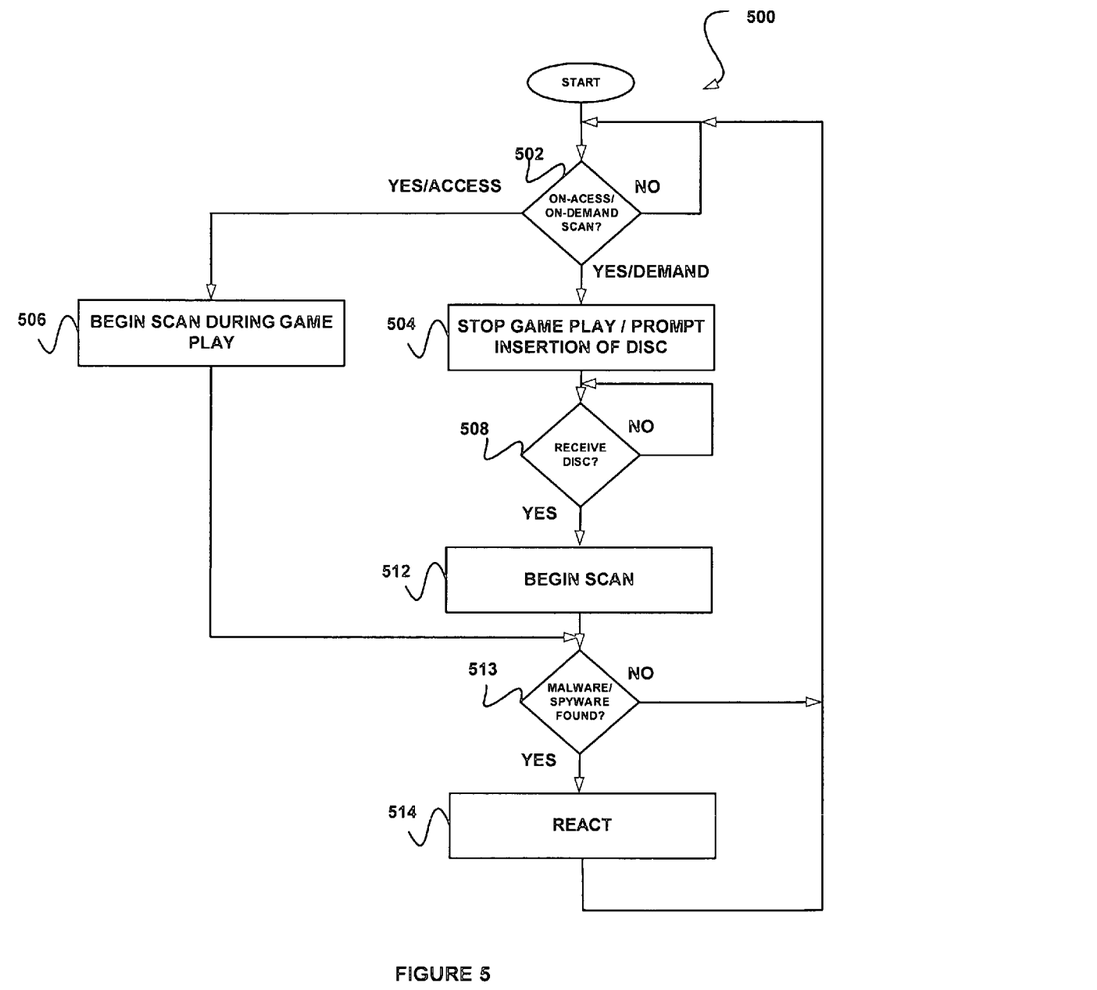
FIG. 5 shows a game console method for scanning game-related data, in accordance with yet another embodiment.

FIG. 5 shows a game console method 500 for scanning game-related data, in accordance with yet another embodiment. As an option, the method 500 may be implemented in the context of the architecture and environment of FIGS. 1-4. Of course, however, the method 500 may be carried out in any desired environment. It should also be noted that the aforementioned definitions may apply during the present description.

As shown in operation 502, it is determined whether a request for a scan has been made (along with a type of request). In one instance, the request for the scan may be on-demand. For example, the request for the scan may be initiated by a user of a game console (see FIG. 4, for example).

Specifically, in various embodiments, the user may request the scan by selecting a scan command via a graphical user interface displayed utilizing the game console. As another option, the user may request the scan by inserting a scan disk into a DVD drive of the game console, a scan cartridge into the game console, and/or a scan memory stick into an I/O adapter of the game console. The user may also request the scan utilizing a network, such as the Internet. As yet another option, an administrator of a server connected to by the game console over the network may initiate the on-demand scan over the network.

In another instance, the request for the scan may be on-access. Just by way of example, an on-access scan may be requested upon any game-related data being read and/or processed by the game console. In particular, the on-access scan may be initiated upon game-related data being downloaded from a network to the game console; upon a game cartridge, game DVD and/or memory stick being inserted into the game console; and/or upon any other action taken by the game console.

The method 500 continuously monitors for a scan request, as shown. If it is determined in operation 502 that an on-demand scan request is received, use of the game console may be stopped. See operation 504.

For example, the use of the game console may be paused. As another option, the use of the game console may be terminated. If the use of the game console is to be terminated, a user of the game console may first be prompted to save the game-related data associated with the use of the game console before the use of the game console is terminated. Of course, the use of the game console may not be stopped, but may optionally continue in parallel with the on-demand scan.

Furthermore, the user may be optionally prompted for data necessary for performing the on-demand scan. See, again, operation 504. For example, the user may be prompted for data stored on a scan disc with scanning logic adapted to scan game-related data associated with the game console. While operation 504 specifies a disc, the data may also be stored on a game cartridge, removable memory stick and/or any other device capable of containing scanning logic. Furthermore, the data may be located within the game console, and the user may be prompted to identify the location of such data.

It is next determined whether the data has been received, as shown in decision 508. If the data has not been received by the user, the method 500 continues to wait until the data is received. As an option, the method 500 may re-prompt the user for the data after a predetermined amount of time. As another option, the method 500 may terminate the on-demand scan if the data has not been received after a predetermined amount of time and/or a predetermined number of such prompts.

Once it is determined in decision 508 that the data has been received, game-related data associated with the game console is scanned, as indicated in operation 512. Specifically, a full scan of all data in the memory and hard drive of the game console may be scanned along with any devices inserted into the gaming console (e.g. DVD, CD, etc.). As shown in operation 512, it is then determined whether malware and/or spyware is identified, based on the scan.

Of course, it may be determined whether any unwanted data is identified based on the scan. If, in operation 512, any type of unwanted data is not identified, the method 500 returns to operation 502 and monitors for a next scan request. If, however, at least one type of unwanted data is identified in decision 513, a reaction is performed in response to the identification.

The reaction may include quarantining the unwanted data, deleting the unwanted data within the game console, sending an alert to the user of the game console prompting the user to select an action to take, sending an alert to a server over the network with a notification of the identified unwanted data along with a network location of the game console associated with the identified unwanted data, and/or any other actions capable of being taken by the game console and/or related device. In addition, the reaction may be based on the type of unwanted data identified.

If it is determined that an on-access scan request has been received instead of an on-demand scan request, the method 500 may proceed to operation 506 where game-related data associated with the game console is scanned. In one embodiment, such game-related data may only include a subset of game-related data that is currently being accessed. Such on-access scan may be performed in parallel with use of the game console. As an option, only data saved to the hard drive may be scanned so as not to slow down use of the game console. In other embodiments, use of the game console may be suspended during the scan.

Based on the scan in operation 506, it is determined whether any malware and/or spyware have been identified. See decision 513. If any type of unwanted data has not been found, the method 500 returns to operation 502 and continues to wait for a next scan request. If, however, at least one type of unwanted data is identified in operation 512, the method 500 proceeds by reacting to the identified unwanted data. Thus, the method 500 is provided for scanning game-related data associated with the game console.

Figure 6:
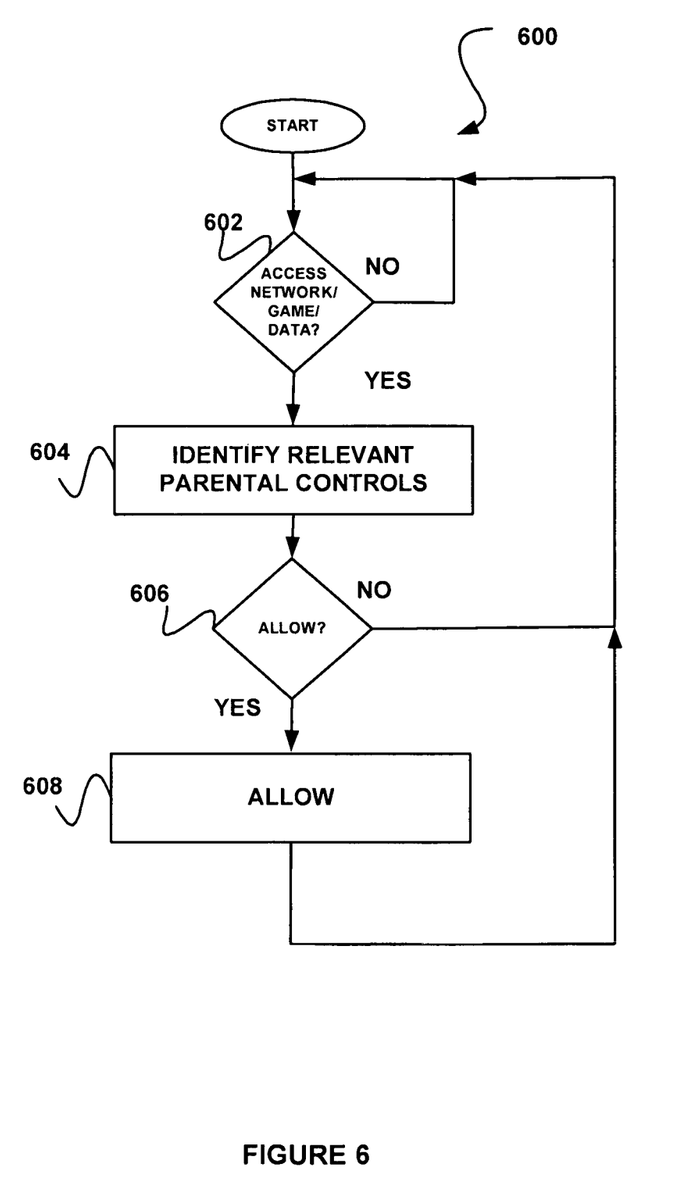
FIG. 6 shows a game console method for executing parental controls, in accordance with still yet another embodiment.

FIG. 6 shows a game console method 600 for executing parental controls, in accordance with still yet another embodiment. As an option, the method 600 may be implemented in the context of the architecture and environment of FIGS. 1-5. Of course, however, the method 600 may be carried out in any desired environment. It should also be noted that the aforementioned definitions may apply during the present description.

As shown in operation 602, it is determined whether the game console has accessed the network and/or game-related data associated with the game console. For example, a user's activities with respect to the game console may be monitored and identified. Based on identified activities, relevant parental controls are then identified. See operation 604. In particular, if a user attempts to connect to the Internet from the game console, parental controls associated with the Internet may be identified. In addition, if a user attempts to use a particular functionality of the game console, such as game play for example, parental controls related to that particular functionality may be identified.

In another embodiment, the relevant parental controls may be based on a particular user utilizing the game console. Specifically, each user of a game console may be required to log on to the game console prior to using the game console, and such log-in information may be utilized to identify parental controls relevant to the log-in information. Still yet, the relevant parental controls may be based on default parental controls. In addition, the relevant parent controls may be based on the type of network connection attempting to be made by the game console. For example, the parental controls may limit the functionality of the game console based on whether the connection is with a personal computer and/or other game console.

Of course it should be noted that the relevant parental controls may be identified in any desired manner. Thus, parental controls may be stored within the game console and may be categorized by activity type. Further, the parental controls may be customized by an authorized user utilizing a graphical user interface displayed to the user on a display device associated with the game console. Since the input capacity of the game console may be limited, it is contemplated that a connection may be made to a typical computer (e.g. see, for example, FIG. 2, etc.) for providing access to the control functionality.

As the user initiates an identified activity, the identified relevant parental controls may be utilized to determine whether the particular activity is allowable, as in operation 606. Just by way of example, if a user of the game console attempts to communicate (e.g. chat) with a remote user through the game console, such as by utilizing a peer-to-peer network, parental controls may be utilized to limit such activity. In particular, parental controls may limit the activity based on the particular user attempting the communication. Thus, a particular user may be prevented from all communication over a network, or may only be allowed to communicate with a specified list of other remote users over the network, and/or with only certain types of devices (e.g. game consoles as opposed to personal computers, etc.).

As another example, all users of a game console may be prevented from accessing any game-related data associated with a particular rating. The rating may identified from within the game-related data, such as for example a rating of a game application. In other embodiments, parental control rating levels may be based on each user.

If it is determined in decision 606 that the activity is allowed 608, the method 600 initiates the processing of the activity and returns to operation 602 where it monitors for a next activity accessed by a user of the game console. If, however, it is determined in decision 606 that the activity is not allowed, the method 600 executes the relevant parental control and therefore blocks the execution of the activity by the game console.

For instance, the parental controls may be utilized to block the execution of specified game-related data. The method 600 then returns to operation 602 where it waits for a next activity accessed by a user of the game console. If the activity is not allowed, the method 600 may also send a message to the user of the console stating that such requested activity is prohibited. In addition, the method 600 may prompt the user for a password in order for the processing of the activity to be initiated. Of course, such messages and prompts may be displayed to the user utilizing a graphical user interface displayed on a display device associated with the game console.

As another option, the method 600 may optionally run continuously such that all activities initiated by a user of the game console may be monitored and appropriate parental controls applied. Such activities may include, but are not limited to, game play and/or accessing a network utilizing the game console. Further, parental control logic capable of executing such parental controls may be located on the game console such that such monitoring is not interrupted.

In one embodiment, terrorism may be countered utilizing the aforementioned technology. According to the U.S. Federal Bureau of Investigation, cyber-terrorism is any "premeditated, politically motivated attack against information, computer systems, computer programs, and data which results in violence against non-combatant targets by sub-national groups or clandestine agents." A cyber-terrorist attack is designed to cause physical violence or extreme financial harm. According to the U.S. Commission of Critical Infrastructure Protection, possible cyber-terrorist targets include the banking industry, military installations, power plants, air traffic control centers, and water systems.

Thus, by optionally incorporating the present technology into the cyber-frameworks of the foregoing potential targets, terrorism may be countered by identifying game-related data as including malware, etc., which may be used to combat cyber-terrorism.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:
    scanning game-related data on a game console for detecting malware;
    scanning the game-related data on the game console for detecting spyware;
    executing parental controls during use of the game console capable of processing the game-related data;

identifying a request for an on-access scan;
performing the on-access scan in parallel with the use of the game console;
identifying another request for an on-demand scan;
stopping game play in response to the on-demand scan; and
prompting a user for the game-related data for performing the on-demand scan;
wherein the game-related data includes a subset of game-related data currently being processed.

2. The method of claim 1, wherein the game-related data includes a video game stored in memory of the game console.

3. The method of claim 1, wherein terrorism is countered via the scanning.

4. The method of claim 1, wherein the on-access scan is requested upon the game-related data being downloaded from a network to the game console, a game cartridge being inserted into the game console, a game DVD being inserted into the game console, or a memory stick being inserted into the game console.

5. A computer-executable program embodied on a non-transitory computer readable storage medium, comprising:
computer code for scanning game-related data on a game console for detecting malware;
computer code for scanning the game-related data on the game console for detecting spyware;
computer code for executing parental controls during use of the game console capable of processing the game-related data;
computer code for identifying a request for an on-access scan;
computer code for performing the on-access scan in parallel with the use of the game console;
computer code for identifying another request for an on-demand scan;
computer code for stopping game play in response to the on-demand scan; and
computer code for prompting a user for the game-related data for performing the on-demand scan;
wherein the game-related data includes a subset of game-related data currently being processed.

6. The program of claim 5, wherein the scanning for detecting malware or the scanning for detecting spyware includes on-demand scanning.

7. The program of claim 5, wherein the scanning for detecting malware or the scanning for detecting spyware includes on-access scanning.

8. The program of claim 5, further comprising computer code for reacting based on at least one of the malware and the spyware being detected during the scanning for detecting malware or the scanning for detecting spyware.

9. The program of claim 5, wherein the use of the game console includes game play associated with the game console.

10. The program of claim 5, wherein the use of the game console includes accessing a network utilizing the game console.

11. The program of claim 10, wherein the network includes the Internet.

12. The program of claim 5, wherein the use of the game console includes accessing the game-related data utilizing the game console.

13. The program of claim 5, wherein the executing the parental controls includes executing the parental controls in response to an identification of the parental controls.

14. The program of claim 13, wherein the parental controls are identified in response to the user logging on to the game console.

15. The program of claim 13, wherein the parental controls are identified based on default parental controls.

16. The program of claim 5, wherein the parental controls are utilized for blocking an execution of specified game-related data.

17. The program of claim 5, wherein the game-related data includes user scores.

18. The program of claim 5, wherein the game-related data includes game-related user profile information.

19. The program of claim 5, wherein the on-access scan is requested upon a memory stick being inserted into the game console.

20. The program of claim 5, wherein the game-related data includes a video game stored in memory of the game console.

21. The program of claim 5, wherein the on-access scan is requested upon the game-related data being downloaded from a network to the game console, a game cartridge being inserted into the game console, a game DVD being inserted into the game console, or a memory stick being inserted into the game console.

22. A system, comprising:
a first scanner, the first scanner for scanning game-related data on a game console for detecting malware;
a second scanner, the second scanner for scanning the game-related data on the game console for detecting spyware;
logic for identifying a request for an on-access scan;
logic for performing the on-access scan in parallel with use of the game console,
the logic for performing executed by at least one processor;
logic for identifying another request for an on-demand scan;
logic for stopping game play in response to the on-demand scan; and
logic for prompting a user for the game-related data for performing the on-demand scan;
wherein the system is operable such that parental controls are executed during processing of the game-related data;
wherein the game-related data includes a subset of game-related data currently being processed.

23. The system of claim 22, wherein the game-related data is stored on a game cartridge.

24. The system of claim 22, wherein the game-related data is stored on a digital video disc (DVD).

25. The system of claim 22, wherein the on-access scan is requested upon the game-related data being downloaded from a network to the game console, a game cartridge being inserted into the game console, a game DVD being inserted into the game console, or a memory stick being inserted into the game console.

* * * * *